United States Patent
Yang et al.

(10) Patent No.: US 10,486,275 B2
(45) Date of Patent: Nov. 26, 2019

(54) PROCESSING MECHANISM

(71) Applicants: FU DING ELECTRONICAL TECHNOLOGY (JIASHAN) CO., LTD., Jiashan (CN); HON HAI PRECISION INDUSTRY CO., LTD., New Taipei (TW)

(72) Inventors: Ming-Lu Yang, New Taipei (TW); Yang-Mao Peng, Jiashan (CN); Jian-Shi Jia, Jiashan (CN); Jing-Shuang Sui, Jiashan (CN); Zhen-Guang Xu, Jiashan (CN); Jun Fu, Jiashan (CN); Jie Li, Jiashan (CN)

(73) Assignees: FU DING ELECTRONICAL TECHNOLOGY (JIASHAN) CO., LTD., Jiashan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/213,780

(22) Filed: Dec. 7, 2018

(65) Prior Publication Data

US 2019/0105744 A1    Apr. 11, 2019

Related U.S. Application Data

(62) Division of application No. 14/712,053, filed on May 14, 2015, now Pat. No. 10,195,702.

(30) Foreign Application Priority Data

Oct. 28, 2014   (CN) .......................... 2014 1 0585740

(51) Int. Cl.
*B23B 3/30*    (2006.01)
*B23B 3/20*    (2006.01)
(Continued)

(52) U.S. Cl.
CPC .............. *B23P 23/02* (2013.01); *B23Q 5/22* (2013.01); *B23Q 11/0025* (2013.01);
(Continued)

(58) Field of Classification Search
CPC .... B23Q 11/0025; B23Q 39/024; B23Q 5/22; B23Q 2705/102; B23P 23/02; B23B 3/065
See application file for complete search history.

(56) References Cited

U.S. PATENT DOCUMENTS

| 1,870,466 | A | * | 8/1932 | Richards | ............ | B23Q 11/0025 |
| | | | | | | 29/33 H |
| 2,109,263 | A | * | 2/1938 | Eckersall | ........... | B23Q 11/0025 |
| | | | | | | 409/183 |

(Continued)

FOREIGN PATENT DOCUMENTS

| JP | 61256019 A | * | 11/1986 | ......... B23Q 11/0025 |
| JP | 03149101 A | * | 6/1991 | ............. B23Q 1/015 |

(Continued)

*Primary Examiner* — Sara Addisu
(74) *Attorney, Agent, or Firm* — ScienBiziP, P.C.

(57) ABSTRACT

A mechanism for machining a workpiece includes a fixing base, a driving member, a connecting member, a cutter, a first guiding sleeve, and a spring. The driving member is positioned above the fixing base. The connecting member is coupled to the driving member. One end of the cutter is fixed to the connecting member, and the cutter is passed through the fixing base to machine the workpiece positioned under the fixing base. The spring is positioned between the connecting member and the fixing base. The spring is compressed when the driving member drives the cutter away from the fixing base to machine the workpiece, and the spring restores to bring the cutter back toward the fixing base after the machining.

10 Claims, 3 Drawing Sheets

(51) Int. Cl.
  *B23P 23/02* (2006.01)
  *B23Q 5/22* (2006.01)
  *B23Q 11/00* (2006.01)
  *B23Q 39/02* (2006.01)
  *B23B 3/06* (2006.01)

(52) U.S. Cl.
  CPC ............ B23Q 39/024 (2013.01); B23B 3/065 (2013.01); B23Q 2705/102 (2013.01)

(56) References Cited

U.S. PATENT DOCUMENTS

| | | | | |
|---|---|---|---|---|
| 2,285,492 | A * | 6/1942 | Clark | B23Q 1/76 101/26 |
| 2,814,167 | A * | 11/1957 | Nichols | B23Q 1/5468 408/1 R |
| 3,527,138 | A * | 9/1970 | Boltz | H02G 1/1265 29/593 |
| 3,753,384 | A * | 8/1973 | Anfindsen | B23B 29/12 409/293 |
| 3,864,695 | A * | 2/1975 | Nagashima | B43L 13/024 346/139 R |
| 3,965,377 | A * | 6/1976 | Carbonneau | F02M 23/10 310/14 |
| 4,084,483 | A * | 4/1978 | Walker | B23Q 11/0025 144/144.1 |
| 4,121,224 | A * | 10/1978 | Takeuchi | B41J 2/49 346/139 C |
| 4,646,595 | A * | 3/1987 | Slee | B23B 29/125 318/571 |
| 4,653,360 | A * | 3/1987 | Compton | B23Q 1/262 318/135 |
| 4,660,481 | A * | 4/1987 | Spickermann | D05B 29/02 112/235 |
| 4,697,318 | A * | 10/1987 | Wickham | B23Q 16/00 29/33 P |
| 4,717,265 | A * | 1/1988 | Shioda | B23Q 11/0025 384/30 |
| 4,825,555 | A * | 5/1989 | Murayama | B26D 3/085 33/1 M |
| 4,831,906 | A * | 5/1989 | Sugimoto | B23B 7/06 82/118 |
| 4,869,626 | A * | 9/1989 | Kosmowski | B23B 31/14 408/129 |
| 5,042,155 | A * | 8/1991 | Yoshioka | G06K 15/22 33/18.1 |
| RE33,910 | E * | 5/1992 | Compton | G05B 19/184 318/135 |
| 5,119,703 | A * | 6/1992 | Ruby | B23B 29/24 407/68 |
| 5,303,510 | A * | 4/1994 | Calkins | B23Q 5/027 451/165 |
| 5,341,689 | A * | 8/1994 | Freudenberger | G01D 18/00 346/146 |
| 6,021,574 | A * | 2/2000 | Murray, III | B41C 1/02 30/164.9 |
| 6,073,323 | A * | 6/2000 | Matsumoto | B23B 3/161 29/27 C |
| 6,079,090 | A * | 6/2000 | Ongaro | B23F 17/006 29/27 C |
| 6,394,892 | B2 * | 5/2002 | Hanisch | B23Q 1/52 451/177 |
| 6,618,917 | B2 * | 9/2003 | Sugiura | B23B 3/162 29/27 C |
| 6,813,839 | B2 * | 11/2004 | McLean | B26B 5/00 144/144.1 |
| 6,834,434 | B2 * | 12/2004 | Nelson | B44B 3/063 33/18.1 |
| 7,267,035 | B2 * | 9/2007 | Uebelhart | B23B 29/323 29/54 |
| 9,409,268 | B2 * | 8/2016 | Yang | B23B 3/065 |
| 9,412,507 | B2 * | 8/2016 | Blanding | H01F 7/123 |
| 9,636,836 | B2 * | 5/2017 | Pierce | B26D 7/0006 |
| 2004/0070124 | A1 * | 4/2004 | Kimura | B23Q 11/0025 267/64.11 |
| 2007/0278866 | A1 * | 12/2007 | Ida | B23Q 11/0025 310/12.25 |
| 2009/0229439 | A1 * | 9/2009 | Hamura | B23Q 1/34 83/875 |
| 2009/0278291 | A1 * | 11/2009 | Kitaura | B23Q 11/0025 267/137 |
| 2013/0025896 | A1 * | 1/2013 | Pierse | B23Q 11/0025 173/152 |
| 2016/0114404 | A1 * | 4/2016 | Yang | B23Q 5/22 |

FOREIGN PATENT DOCUMENTS

| | | | | |
|---|---|---|---|---|
| JP | 2002254265 A | * | 9/2002 | ........ B23Q 11/0025 |
| JP | 2011110645 A | * | 6/2011 | ........ B23Q 11/0025 |

* cited by examiner

PROCESSING MECHANISM

CROSS-REFERENCE TO RELATED APPLICATION

The present application is a divisional and continuation application of U.S. patent application Ser. No. 14/712,053, filed on May 14, 2015, which claims priority to Chinese Application No. 201410585740.6 filed on Oct. 28, 2014, the contents of which are entirely incorporated by reference herein.

FIELD

The subject matter herein generally relates to machining during manufacture.

BACKGROUND

Some workpieces need to be machined with different treatments, such as milling, or while in a lathe.

BRIEF DESCRIPTION OF THE DRAWINGS

Implementations of the present technology will now be described, by way of example only, with reference to the figures.

DETAILED DESCRIPTION

Figure 1:
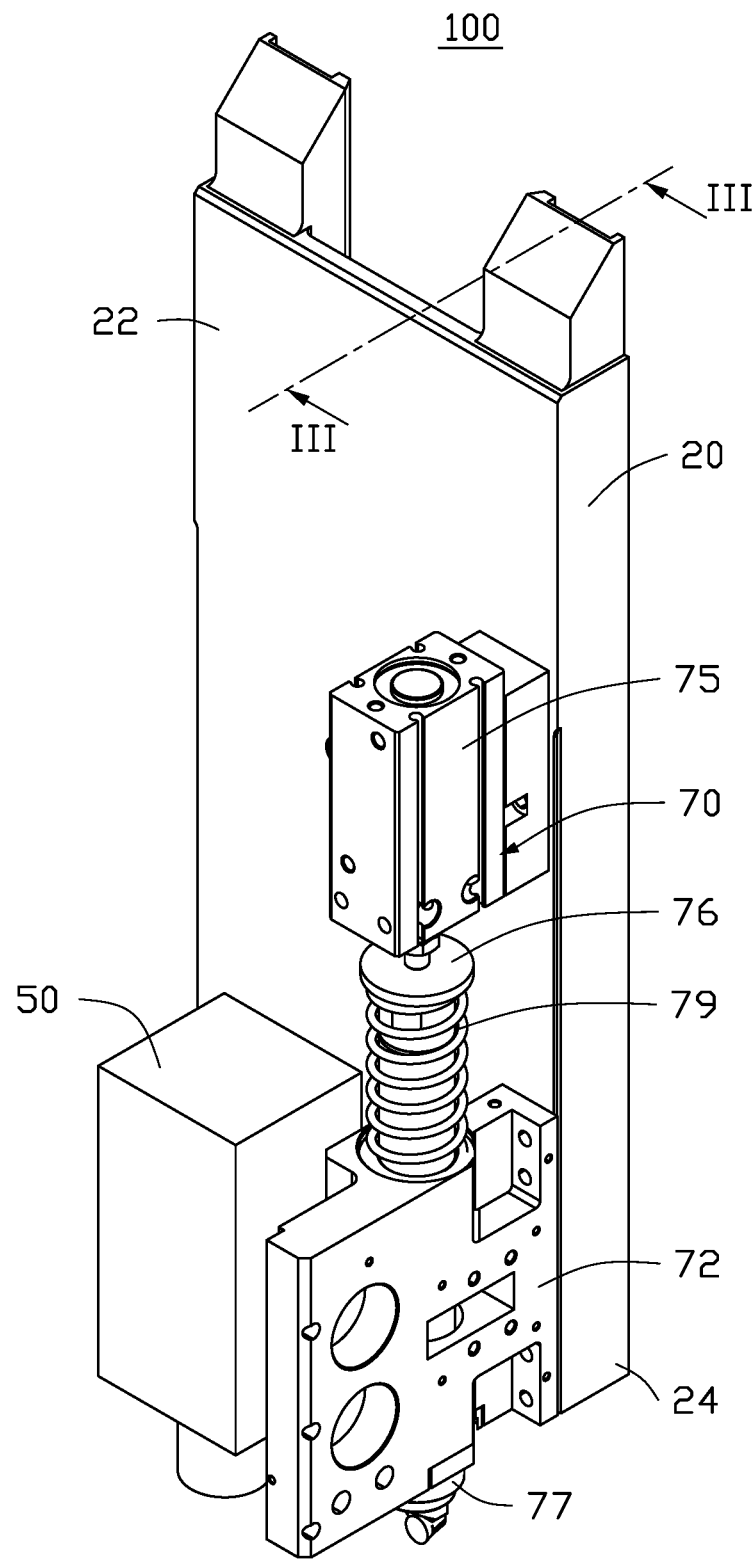
FIG. 1 is an isometric view of an embodiment of a processing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure is described in relation to a processing mechanism for machining a workpiece. The mechanism can include a fixing base, a driving member, a connecting member, a cutter, and a spring. The driving member can be positioned above the fixing base. One end of the connecting member can be coupled to the driving member. One end of the cutter can be fixed to an end of the connecting member away from the driving member, and the cutter can be configured to be driven to pass through the fixing base to machine the workpiece positioned under the fixing base. The spring can be positioned between the connecting member and the fixing base. The spring is compressed when the driving member drives the cutter away from the fixing base to machine the workpiece, and the spring can restore to bring the cutter back toward the fixing base. The connecting member can include a blocking portion extending out from the end portion of the connecting member adjacent to the driving member. The spring can be sleeved on the cutter and opposite ends of the spring can be positioned between the blocking portion and the fixing base.

The present disclosure is further described in relation to a processing device for machining a workpiece. The processing device can include a mounting member, a first processing mechanism, and a second processing mechanism separately mounted on the mounting member. The second processing mechanism can include a fixing base, a driving member, a cutter, and an elastic member. The fixing base and the driving member can be separately mounted on the mounting member. The driving member can be positioned above the fixing base. One end of the cutter can be fixed to the driving member, and the cutter can be driven to pass through the fixing base and finally machine the workpiece positioned under the fixing base. The elastic member can be positioned between the driving member and the fixing base. The elastic member is compressed during the driving member moving the cutter away from the fixing base to machine the workpiece, and the cutter is brought back to its original position because of elastic force of the compressed elastic member.

FIG. 1 illustrates a processing device 100 for machining a workpiece (not shown). The processing device 100 can include a mounting member 20, a first processing mechanism 50, and a second processing mechanism 70 separately positioned on the mounting member 20. The first processing mechanism 50 can be a mechanism for applying milling tool to the workpiece. The second processing mechanism 70 can apply a tool to the workpiece held in a lathe. For simplicity, other configurations of the processing device 100, such as a fixing mechanism for coupling the mounting member 20 to the machine tool, are not described here.

The mounting member 20 can include a first end portion 22 and an opposite second end portion 24. In the embodiment, the first processing mechanism 50 can be positioned on the second end portion 24.

Figure 2:
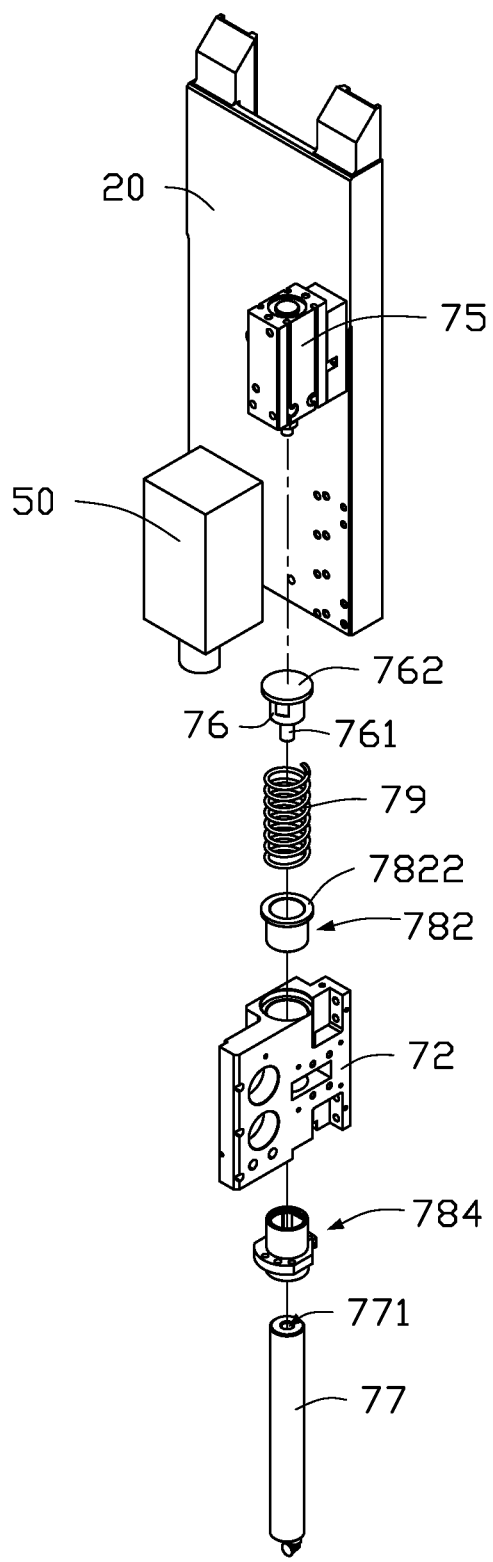
FIG. 2 is an exploded, isometric view of the processing device of FIG. 1.

FIGS. 1 and 2 illustrate that the second processing mechanism 70 includes a fixing base 72, a driving member 75, a cutter 77, and an elastic member 79. The fixing base 72 can be fixed on the mounting member 20 adjacent to the first processing mechanism 50. The driving member 75 can be fixed on the mounting member 20 and located above the fixing base 72. One end of the cutter 77 can be fixed to the driving member 75. The cutter 77 can be moved through the fixing base 72 to machine the workpiece positioned under the fixing base 72. The elastic member 79 can be positioned between the driving member 75 and the fixing base 72.

Figure 3:
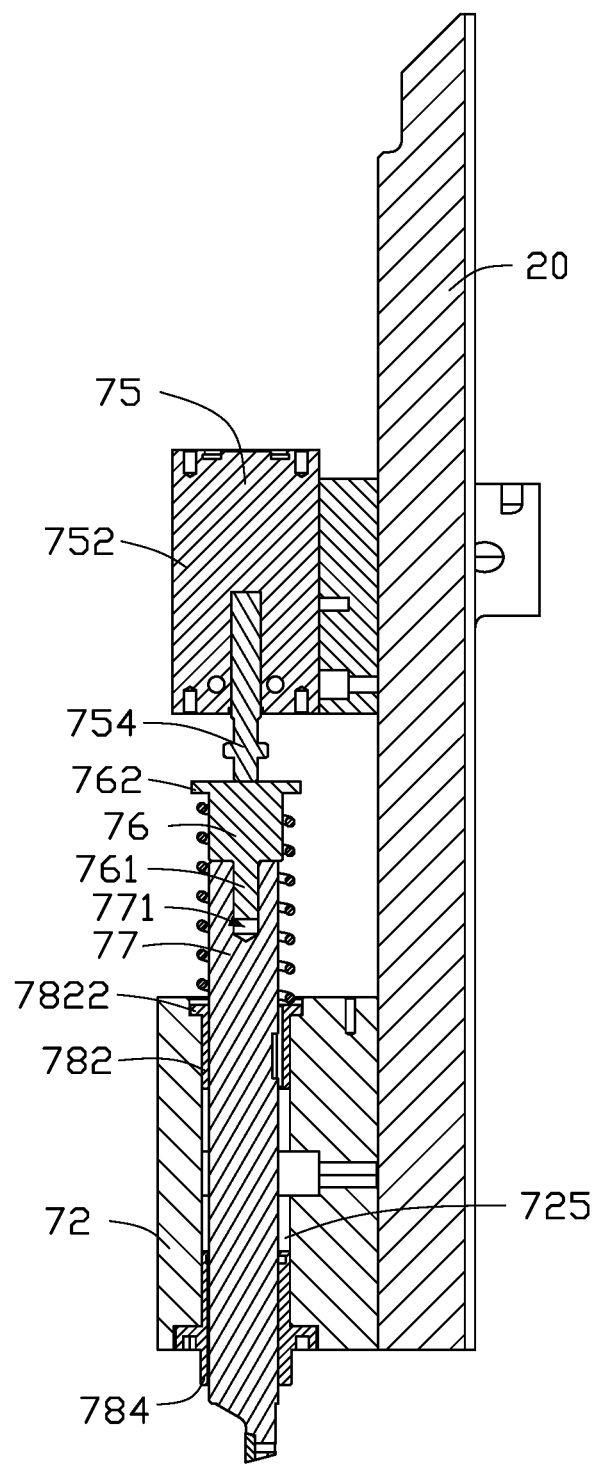
FIG. 3 is a cross-sectional view along line of FIG. 1.

FIG. 3 illustrates that, in the embodiment, the fixing base 72 can be fixed on the second end portion 24 of the mounting member 20. The fixing base 72 can define a through receiving hole 725 for receiving the cutter 77.

The driving member 75 can include a driving base 752 and a driving rod 754. The driving base 752 can be fixed on the mounting member 20 and be located above the fixing base 72. The driving rod 754 can be movably coupled to an end of the driving base 752 toward the fixing base 72. In the illustrated embodiment, the driving member 75 can be a cylinder.

One end of the cutter 77 can be coupled to the driving rod 754, the other end of the cutter 77 can pass through and extend from the receiving hole 725 for machining the workpiece. In the illustrated embodiment, the second processing mechanism 70 can further include a connecting member 76. One end of the connecting member 76 can be coupled to an end of the driving rod 754 away from the driving member 752, the other end of the connecting member 76 can be coupled to an end of the cutter 77 adjacent to the driving member 75, thus connecting cutter 77 with the driving rod 754. The connecting member 76 includes a rod portion 761 extending out from an end portion of the connecting member 76 adjacent to the cutter 77, and one end of the cutter 77 adjacent to the connecting member 76 defines a coupling hole 771. The rod portion 761 is inserted into the coupling hole 771, thereby the connecting member 76 is coupled to the cutter 77.

The second processing mechanism 70 can further include a first guiding sleeve 782 and a second guiding sleeve 784, which guide the cutter 77 and reduce friction between the cutter 77 and the fixing base 72. The first guiding sleeve 782 can be mounted and received in an end portion of the receiving hole 725 toward the driving member 75. The second guiding sleeve 784 can be partially received in an end portion of the receiving hole 725 away from the driving member 75. In the illustrated embodiment, the first guiding sleeve 782 and the second guiding sleeve 784 can be linear bearings.

FIG. 1 illustrates the elastic member 79 sleeved on the cutter 77 and positioned between the driving member 75 and the fixing base 72, to bring the cutter 77 back to its original position after machining the workpiece. In the illustrated embodiment, the first guiding sleeve 782 can form a flange 7822 extending out from an end portion of the first guiding sleeve 782 adjacent to the driving member 75. The connecting member 76 can include a blocking portion 762 extending out from an end portion of the connecting member 76 adjacent to the driving member 75. The elastic member 79 can be a spring. The elastic member 79 resists between the flange 7822 and the blocking portion 762.

In assembly, the first processing mechanism 50 and the fixing base 72 can be mounted on the mounting member 20 separately. The first guiding sleeve 782 and the second guiding sleeve 784 can be fixed in two ends of the receiving hole 725. The driving member 75 can be mounted on the mounting member 20 and located at a side of the fixing base 72 adjacent to the first end portion 22. The connecting member 76 can be fixed to the end of the driving rod 754 adjacent to the fixing base 72. The cutter 77 can pass through the fixing base 72. The elastic member 79 can be sleeved on the cutter 77. Two opposite ends of the elastic member 79 can be positioned on the guiding sleeve 78 and the connecting member 76. An end of the cutter 77 away from the fixing member 72 can be coupled to the connecting member 76.

When the workpiece is milled by the first processing mechanism 50, the second processing mechanism 50 can be idle. After a milling process, the driving rod 754 moves towards the second end portion 24 to extend the cutter 77 from the fixing base 72 by a preset distance for applying a tool to workpiece held in a lathe and positioned under the fixing base 72. The elastic member 79 remains in a compressed state during lathe process. After the lathe process, the cutter 77 is driven back to its original position because of an elastic force of the compressed elastic member 79, and one end of the cutter 77 away from the driving member 75 is wholly received in the receiving hole 725.

In other embodiments, the elastic member 79 is only positioned between the driving member 75 and the fixing member 72. The elastic member 79 is not limited to being a spring. The connecting member 76 can be omitted when the cutter 77 is coupled to the driving rod 754 directly and the elastic member 79 is positioned between the fixing member 72 and the driving base 752. The first guiding sleeve 782 and the second guiding sleeve 784 can be omitted. The first processing mechanism 50 can be other processing mechanisms, such as, but not limited to, a boring tool mechanism or a lathe tool mechanism. The second processing mechanism 70 can be other processing mechanisms, such as, but not limited to, a milling tool mechanism.

The embodiments shown and described above are only examples. Many details are often found in the art such as the other features of a processing mechanism and a processing device using the processing mechanism. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A processing mechanism for machining a workpiece, the processing mechanism comprising:
    a fixing base defining a receiving hole;
    a driving member positioned above the fixing base;
    a cutter, one end of the cutter being fixed to the driving member, and the cutter being adapted to be driven to move passing through the fixing base and to machine the workpiece positioned under the fixing base;
    a connecting member coupled between the driving member and the cutter, the connecting member comprising a blocking portion extending out from an end portion of the connecting member adjacent to the driving member;
    a first guiding sleeve mounted in an end portion of the receiving hole adjacent to the driving member;
    a second guiding sleeve partially received in an end portion of the receiving hole away from the driving member; and
    an elastic member positioned between the connecting member and the fixing base;
    wherein the elastic member is compressed when the driving member drives the cutter to move away from the fixing base to machine the workpiece, and the cutter is adapted to be driven back to an original position by the compressed elastic member; and
    wherein the first guiding sleeve comprises a flange extending out from an end portion of the guiding sleeve adjacent to the driving member, and two opposite ends of the elastic member are abutted against the flange of the first guiding sleeve and the blocking portion of the connecting member, respectively.

2. The processing mechanism of claim 1, wherein the cutter movably passes through the receiving hole, and one other end of the cutter away from the driving member is adapted to be received in the receiving hole.

3. The processing mechanism of claim 1, wherein the driving member comprises a driving base and a driving rod, the driving base is positioned above the fixing base, the driving rod is movably coupled to an end of the driving base toward the fixing base, and the connecting member is coupled to the driving rod away from the driving member.

4. The processing mechanism of claim 1, wherein the first guiding sleeve and the second guiding sleeve are linear bearings.

5. The processing mechanism of claim 1, wherein the connecting member further comprises a rod portion extending out from an end portion of the connecting member adjacent to the cutter, and one end of the cutter adjacent to the connecting member defines a coupling hole, the rod portion is inserted into the coupling hole, thereby the connecting member is coupled to the cutter.

6. A processing mechanism for machining a workpiece, comprising:
   a fixing base defining a receiving hole;
   a driving member positioned above the fixing base;
   a first guiding sleeve mounted in an end portion of the receiving hole adjacent to the driving member;
   a cutter, one end of the cutter fixed to the driving member, and the cutter being adapted to be driven to move pass through the fixing base and to machine the workpiece positioned under the fixing base;
   a connecting member coupled between the driving member and the cutter, the connecting member comprising a blocking portion extending out from an end portion of the connecting member adjacent to the driving member, and a rod portion extending out from an end portion of the connecting member adjacent to the cutter; and
   an elastic member positioned between the connecting member and the fixing base;
   wherein the elastic member is compressed when the driving member drives the cutter to move away from the fixing base to machine the workpiece, and the cutter is driven back to an original position by the compressed elastic member;
   wherein the fixing base defines a receiving hole, the cutter movably passes through the receiving hole, and an end of the cutter away from the driving member is adapted to be received in the receiving hole;
   wherein one end of the cutter adjacent to the connecting member defines a coupling hole, the rod portion is inserted into the coupling hole, thereby the connecting member is coupled to the cutter; and
   wherein the first guiding sleeve comprises a flange extending out from an end portion of the guiding sleeve adjacent to the driving member, and the ends of the elastic member are respectively abutted against the flange of the guiding sleeve and the blocking portion of the connecting member.

7. The processing mechanism of claim 6, wherein the cutter movably passes through the receiving hole, and an end of the cutter away from the driving member is adapted to be received in the receiving hole.

8. The processing mechanism of claim 6, wherein the driving member comprises a driving base and a driving rod, the driving base is positioned above the fixing base, the driving rod is movably coupled to an end of the driving base toward the fixing base, and the connecting member is coupled to the driving rod away from the driving member.

9. The processing mechanism of claim 6, wherein the processing mechanism further comprises a second guiding sleeve, and the second guiding sleeve is partially received in an end portion of the receiving hole away from the driving member.

10. The processing mechanism of claim 9, wherein the first guiding sleeve and the second guiding sleeve are linear bearings.

* * * * *